(12) United States Patent
Li et al.

(10) Patent No.: US 8,442,406 B2
(45) Date of Patent: May 14, 2013

(54) FILTER, COHERENT RECEIVER DEVICE AND COHERENT RECEIVING METHOD

(75) Inventors: Jianqiang Li, Beijing (CN); Huijian Zhang, Beijing (CN); Zhenning Tao, Beijing (CN); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 13/020,831

(22) Filed: Feb. 4, 2011

(65) Prior Publication Data

US 2011/0243561 A1 Oct. 6, 2011

(30) Foreign Application Priority Data

Apr. 2, 2010 (CN) .......................... 2010 1 0140039

(51) Int. Cl.
*H04B 10/00* (2006.01)
*H04B 10/04* (2006.01)
*H04B 10/06* (2006.01)

(52) U.S. Cl.
USPC ........... 398/204; 398/155; 398/183; 398/208; 398/209; 398/211

(58) Field of Classification Search ............ 398/202, 398/204, 209, 155, 183
See application file for complete search history.

(56) References Cited

U.S. PATENT DOCUMENTS

| | | | |
|---|---|---|---|
| 4,055,727 A | 10/1977 | Katoh | |
| 5,214,390 A | 5/1993 | Montreuil | |
| 7,627,252 B2 * | 12/2009 | Sun et al. ...................... | 398/155 |
| 7,630,650 B2 * | 12/2009 | Hoshida et al. ............... | 398/183 |
| 8,103,178 B2 * | 1/2012 | McKinney .................... | 398/211 |
| 8,295,714 B2 * | 10/2012 | Winzer ......................... | 398/209 |
| 2009/0129787 A1 * | 5/2009 | Li et al. ........................ | 398/208 |

FOREIGN PATENT DOCUMENTS

| | | |
|---|---|---|
| CN | 101552640 | 10/2009 |
| CN | 101599929 | 12/2009 |

OTHER PUBLICATIONS

F. Machi et al., "111-Gb/s PolMux-Quadrature Duobinary for Robust and Bandwidth Efficient Transmission", IEEE Photonics Technology Letters, vol. 22, No. 11, Jun. 1, 2010, pp. 751-753.
Peter Kabal et al., "Partial-Response Signaling", IEEE Transactions on Communications, vol. COM-23, No. 9, Sep. 1975, pp. 921-934.
Jitendra K. Tugnait et al., "Blind Equalization and Channel Estimation with Partial Response Input Signals", IEEE Transactions on Communications, vol. 45, No. 9, Sep. 1997, pp. 1025-1031.
Ezra Ip et al., "Feedforward Carrier Recovery for Coherent Optical Communications", Journal of Lightwave Technologies, vol. 25, No. 9, Sep. 2007, pp. 2675-2692.

(Continued)

*Primary Examiner* — Kenneth Vanderpuye
*Assistant Examiner* — Claudius Taylor
(74) *Attorney, Agent, or Firm* — Staas & Halsey LLP (57) ABSTRACT

The present invention relates to filter, coherent receiver device and coherent receiving method. The filter is used for converting a partial response signal into a full response signal, wherein the filter uses the following transfer function $H_{Pre\text{-}Filter}(z)$ with respect to a partial response signal having a transfer function $$H_{PR}(z) = A(1 + z^{-1})^m (1 - z^{-1})^n :$$

$$H_{Pre\text{-}Filter}(z) = \frac{1}{A(1 + \alpha z^{-1})^m (1 - \alpha z^{-1})^n},$$

in which A is other item, m and n are integers larger than or equal to 0 but not being 0 at the same time, $0 < \alpha < 1$.

12 Claims, 6 Drawing Sheets

OTHER PUBLICATIONS

Andreas Levin et al., "Frequency Estimation in Intradyne Reception", IEEE Photonics Technology Letters, vol. 19, No. 6, Mar. 15, 2007, pp. 366-368.

Ilya Lyubomirsky, "Quadrature Duobinary for High-Spectral Efficiency 100G Transmission", Journal of Lightwave Technology, vol. 28, No. 1, Jan. 1, 2010, pp. 91-96.

* cited by examiner

FILTER, COHERENT RECEIVER DEVICE AND COHERENT RECEIVING METHOD

CROSS-REFERENCE TO RELATED APPLICATIONS

This application is based upon and claims the benefit of priority from Chinese Patent Application No. 201010140039.5 filed on Apr. 2, 2010, the entire contents of which are incorporated herein by reference.

FIELD OF THE INVENTION

The present invention relates to a filter, coherent receiver device and method, and particularly, to a pre-filter, coherent receiver device and coherent receiving method of Partial Response Quadrature Amplitude Modulation (PR-QAM) system.

BACKGROUND OF THE INVENTION

The optical fiber transmission system of low cost and high capacity is the development direction in the future optical communication. In order to further reduce the cost of single bit transportation and improve the capacity of single optical fiber, using the advanced modulation format having more compact spectrum is a good solution. The Partial Response Quadrature Amplitude Modulation (PR-QAM) is also called as Quadrature Partial Response (QPR) system, as it has a high spectral efficiency, related studies have been carried out in the field of optical communication. PR-QAM is a modulation format that combines the characteristics of the partial response and the quadrature amplitude modulation. The partial response system achieves a high spectral efficiency by introducing controlled Inter-Symbol Interference (ISI). In the partial response system, the first category of partial response signal is also called as duobinary signal, which has a smooth spectrum and can be generated by a physically implementable filter, and hence is widely studied and applied.

Currently, the coherent receiver device provided with respect to the PR-QAM optical communication system does not adopt adaptive equalization technique. In order to exert the advantages of the digital signal processing (DSP) technique in functions and performances, the adaptive equalization technique is expected to be widely used in the coherent receiver of the PR-QAM system to overcome the linear damage caused by the link. However, the constant modulus algorithm (CMA) or its improved equalization algorithm commonly used in the coherent receiver cannot be directly used in the PR-QAM system. This is because an important precondition of the CMA and its improved algorithm is that the signal to be processed shall meet the statistic characteristic requirement of independent identical distribution, while the PR-QAM system violates the requirement because it introduces the controlled ISI, thus the receiver device needs to be redesigned. The method of inserting digital pre-filter and post-filter in front of and behind the CMA-based adaptive equalization module respectively can effectively solve this problem. However, the conventional technique assumes that the system does not have the problem of carrier phase recovery in the typical optical coherent communication system, or has eliminated the problem of phase mismatching by using the phase lock loop technique of the receiver front end. But due to the defect caused by the loop-delay of the phase lock loop, the equalization is generally expected to be performed in the optical communication system prior to the phase recovery in the digital domain. In addition, the pre-filter device in the conventional technique is relatively complicated, which increases the complexity of hardware.

Literatures beneficial for understanding the present invention and the prior art are listed as follows, and they are incorporated herein by reference, as if completely described in this text.
1. "Partial response, quadrature amplitude modulation system" Tadayoshi Katoh, U.S. Pat. No. 4,055,727, Oct. 25, 1977.
2. "Method and apparatus for partial response demodulation", Leo Montreuil, U.S. Pat. No. 5,214,390, May 25, 1993.
3. Kazuro KIKUCHI, Yuta ISHIKAWA, and Kazuhiro KATOH, "Coherent Demodulation of Optical Quadrature Duobinary Signal with Spectral Efficiency of 4 bit/s/Hz per Polarization," ECOC 07, Sep. 16-20, 2007 Berlin, Germany.
4. Ilya Lyubomirsky, "Quadrature Duobinary for High-Spectral Efficiency 100G Transmission," Journal of Lightwave Technology, to be published (www.ee.ucr.edu/~ilyubomi/JLT-11759-2009-Final.pdf)
5. I. Lyubomirsky, "Quadrature duobinary modulation for 100G transmission beyond the Nyquist limit," to be presented in Optical Fiber Communication Conference (OFC), paper OThM4, San Diego, USA, March 2010.
6. Peter Kabal and Subbarayan Pasupathy, "Partial-response signaling," IEEE Transactions on Communications, Vol. 23, No. 9, pp. 921-934, September 1975
7. Jitendra K. Tugnait and Uma Gummadavelli, "Blind Equalization and Channel Estimation with Partial Response Input Signals," IEEE Transactions on Communications, vol. 45, no. 9, pp. 1025-1031, September 1997
8. Ezra Ip and Joseph M. Kahn, "Feed forward Carrier Recovery for Coherent Optical Communications," Journal of Lightware Technology, vol. 25, no. 9, pp. 2675-2692, September 2007
9. Andreas Leven, Noriaki Kaneda, Ut-VaKoc, and Young-Kai Chen, "Frequency Estimation in Intradyne Reception," IEEE Photonic Technology Letters, vol. 19, no. 6, pp. 366-368, March 2007.

SUMMARY OF THE INVENTION

The present invention is developed with respect to one or more problems caused by the limitation of the prior art, and provides at least one beneficial selection.

According to an aspect of the present invention, a filter is provided for converting a partial response signal into a full response signal, wherein the filter uses the following transfer function $H_{Pre-Filter}(z)$ with respect to a partial response signal having a transfer function $H_{PR}(z)=A(1+z^{-1})^m(1-z^{-1})^n$:

$$H_{Pre-Filter}(z) = \frac{1}{A(1+\alpha z^{-1})^m(1-\alpha z^{-1})^n},$$

in which A is other item, m and n are integers larger than or equal to 0 but not being 0 at the same time, $0<\alpha<1$.

In one embodiment, the A takes a value as 1.

In one embodiment, the m takes a value as 1, and the n takes a value as 0.

In one embodiment, $\alpha$ is between 0.75 and 0.85.

The usage of the pre-filter according to the present invention makes it possible to use the CMA and its improved equalization algorithm in the optical coherent receiver device, so that the optical coherent receiver can easily and reliably process the linear damage caused by the link. In addition, the filter function of the pre-filter according to the embodiments of the present invention is very simple, thus the pre-filter according to the embodiments of the present invention has a simple structure, a low order, and hence a low cost.

According to another aspect of the present invention, a coherent receiver device is provided, including a receiver front end for converting a received partial response optical signal into a partial response digital signal; a pre-filter according to the previous aspects for converting the partial response digital signal into a full response digital signal; an equalizing device for equalizing the pre-filtered full response digital signal; a phase recovering device for performing a phase recovery of a signal equalized by the equalizing device; and a post-filter for post-filtering a signal having undergone a phase recovery by the phase recovering device, wherein a transfer function of the post-filter is same as that of the partial response digital signal.

In one embodiment, the equalizing device performs an adaptive equalization by using a CMA or an improved algorithm based on the CMA.

According to another aspect of the present invention, a coherent receiving method is provided, including: a front end processing process for converting a received partial response optical signal into a partial response digital signal; a pre-filtering process for converting the partial response digital signal into a full response digital signal by using a filter according to the previous aspects; an equalizing process for equalizing the full response digital signal; a phase recovering process for performing a phase recovery of a signal having undergone the equalizing process; and a post-filtering process for post-filtering a phase recovered signal having undergone the phase recovering process, wherein a transfer function used in the post-filtering process is same as that of the partial response digital signal.

In the coherent receiver device and the coherent receiving method according to the embodiments of the present invention, since the pre-filter according to the embodiments of the present invention is used, CMA and its improved equalization algorithm can be adopted, so as to easily and reliably process the linear damage caused by the link. In addition, the structure is very simple and the cost is low.

The coherent receiver according to the embodiments of the present invention places the phase recovering module between the pre-filter and the post-filter, so as to consider the function of phase recovery, and a feedback system (e.g., the phase lock loop in the simulation domain) is no longer required for the phase recovery. In addition, the complexity of the phase recovering device is maintained low.

In addition, the method and device (filter and coherent receiver) of the present invention are suitable to any appropriate system using PR-QAM, including various partial response types and QAM of various scales, thus they have a very good universality.

These and further aspects, embodiments and features of the present invention will be clearer with reference to the following descriptions and drawings. The specific embodiments of the present invention are detailedly disclosed in the following descriptions and drawings to point out the ways of using the principle of the present invention. But it shall be appreciated that the scope of the present invention is not limited by these embodiments, and the embodiments of the present invention include many changes, modifications and equivalents within the scope of the spirit and provisions of the accompanied claims.

Features described and/or illustrated with respect to one embodiment can be used in one or more other embodiments in a same or similar way, and/or combine with or replace features in other embodiments.

To be noted, the term "include/comprise" or "including/comprising" herein refers to existence of feature, component, step and assembly, not excluding existence or addition of one or more other features, components, steps, assemblies or a combination thereof.

DETAILED DESCRIPTIONS OF THE INVENTION

Descriptions of respective embodiments of the present invention are given as follows in conjunction with the drawings. These embodiments are just exemplary, instead of limitations to the present invention. In order that a person skilled in the art can easily understand the principle and embodiments of the present invention, the embodiments of the present invention are described by taking the optical communication system as an example. To be noted, the embodiments of the present invention are suitable to all communication systems using PR-QAM modulation format, and are not limited to the optical communication system.

Figure 1:
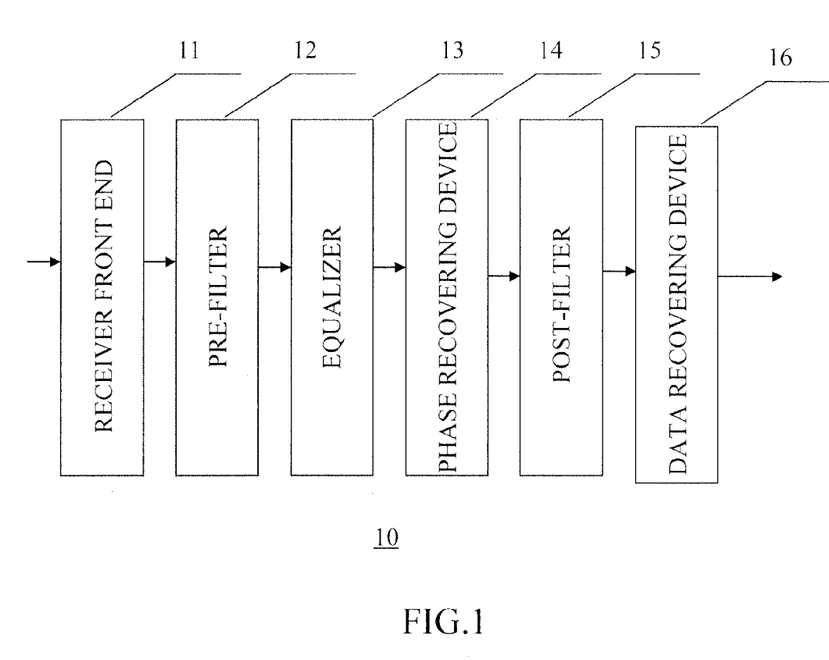
FIG. 1 illustrates a schematic diagram of a coherent optical receiver device according to an embodiment of the present invention.

FIG. 1 illustrates a schematic diagram of a coherent optical receiver device according to an embodiment of the present invention. To be noted, other components which are necessary for the receiver to complete its functions but not so helpful to describe and understand the present invention are omitted in the drawings. These omitted components can be implemented using various devices and methods well known by a person skilled in the art currently or to be known in future, and they can be implemented using commercially available elements or specially fabricated components. These omitted components or DSP modules for example include, but not limited to, power supply, receiver front end unbalance compensation module, large scale dispersion compensation module, nonlinear compensation module, etc.

As illustrated in FIG. 1, a coherent receiver device 10 according to an embodiment of the present invention includes a receiver front end 11, a pre-filter 12, an equalizer 13, a phase recovering device 14, a post-filter 15 and a data recovering device 16.

The receiver front end 11 is configured to perform a front end processing of a received signal (analog PR-QAM optical signal in this embodiment). After the front end processing, the analog PR-QAM signal becomes a digital PR-QAM signal. This signal is pre-filtered by the pre-filter 12. The equalizer 13 (preferably adaptive equalizer) equalizes the pre-filtered signal (adaptive equalization), the phase recovering device 14 performs a phase recovery of the signal adaptively equalized, and the post-filter 15 post-filters the signal having undergone the phase recovery. The signal having post-filtered is sent to the data recovering device 16 for a data recovery, and then entered into the subsequent data processing.

Figure 2:
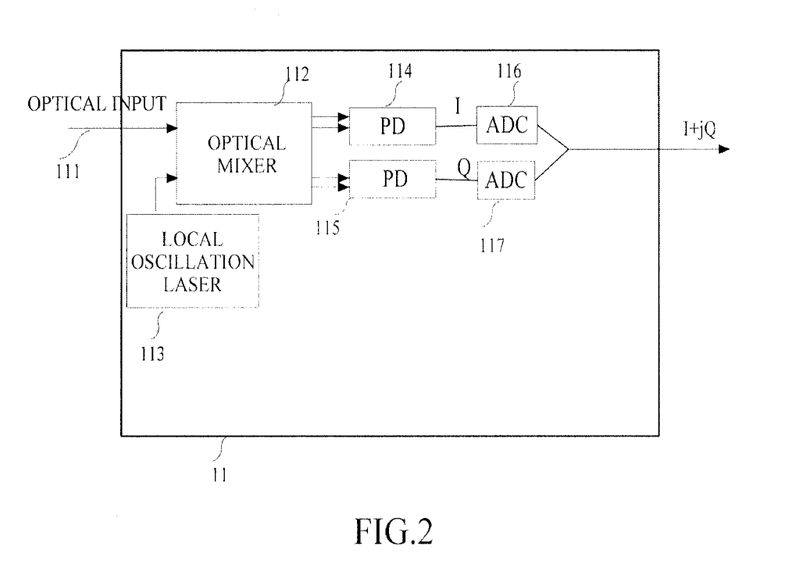
FIG. 2 illustrates a structural diagram of a receiver front end according to an embodiment of the present invention.

FIG. 2 illustrates a structural diagram of the receiver front end 11 according to an embodiment of the present invention.

As illustrated in FIG. 2, the receiver front end 11 comprises an optical mixer 112, a local oscillation laser 113, photoelectric detectors 114, 115 and Analog-to-Digital Converters (ADCs) 116, 117. The receiver front end 11 converts an optical signal 111 into a base-band digital electric signal I+jQ, wherein I is an in-phase component, and Q is a quadrature component. In this text, the base-band digital electric signal I+jQ is the PR-QAM signal in the digital domain.

FIG. 2 is just an example for implementing the receiver front end 11, and a person skilled in the art can use other structures to implement the receiver front end 11. The constructions and usages of the optical mixer 112, the local oscillation laser 113, the photoelectric detectors 114, 115 and the ADCs 116, 117 are clear to a person skilled in the art, and hence are not described herein.

The pre-filter 12 is used to convert a partial response signal into a full response signal, i.e., to remove an artificially controlled portion ISI introduced by the partial response system. A direct solution is to design the transfer function of the pre-filter as an inversion of the partial response transfer function. But the inventor of the present invention finds that according to the digital signal processing theory, the typical partial response transfer function has zero point on the complex plane unit circle, thus the transfer function does not have a strict inversion, and the pre-filter transfer function shall be designed as an approximate inversion (or called as quasi-inversion) of the partial response transfer function.

The z conversion (z domain transfer function) of the common partial response signal generally has the following universal form:

$$H_{PR}(z) = A(1+z^{-1})^m (1-z^{-1})^n, \text{ wherein } m,n \geq 0 \quad (1)$$

In fact, m and n are generally small integers; they have different values under different partial response types, and will not be zero at the same time. A is other item, and its value and expression varies with the partial response type. For example, with respect to the very typical partial response type, the value of A is usually 1. Of course, with respect to more complicated partial response type, the value and expression of A may also be complicated. For example, the transfer function with respect to the typical first category of partial response signal (also called as duobinary signal) is:

$$H_{Duobinary}(z)1 = z^{-1}, \text{ wherein, } m=1, n=0 \quad (2)$$

Based on the inventor's study on the z conversion (z domain transfer function) of the shock response sequence of the partial response, the present invention acquires the approximate inversion of the partial response transfer function by adding a coefficient α.

According to an embodiment of the present invention, the transfer function (z domain transfer function) $H_{Pre-Filter}(z)$ of the pre-filter 12 is determined as:

$$H_{Pre-Filter}(z) = \frac{1}{A(1+\alpha z^{-1})^m (1-\alpha z^{-1})^n}, \quad (3)$$

wherien $m, n \geq 0, \quad 0 < \alpha < 1$

Particularly, the pre-filter z domain transfer function for the duobinary signal is $$H_{Pre-Filter\_Duobinary}(z) = \frac{1}{1+\alpha z^{-1}}, \quad 0 < \alpha < 1 \quad (4)$$

As can be seen from equations (1) to (4), the parameter α is introduced to move the zero point of the partial response transfer function into the unit circle on plane z, so as to obtain the approximate inversion of the partial response transfer function, and finally the condition that the partial response has no strict inversion is effectively avoided. When α is selected, an optimization shall be carried out according to the actual system, but the following principles shall be observed:

1) α shall be close to 1, so that the approximation degree of the inversion of the pre-filter transfer function represented by equation (3) in relation to the partial response shall be higher, and the pre-filter can effectively eliminate the inter-symbol correlation to meet the prerequisites of CMA and its improved algorithm.

2) at the same time, α shall not be infinitely close to 1, because in that case, the pre-filter will infinitely amplify a part of the original noise, which may make the CMA not converge or its performance not ideal.

The inventor of the present invention performs a simulation of the selection of the above coefficient. The simulation environment is set as the currently dominant 112 Gbit/soptical fiber communication system, wherein the modulation format is duobinary-QPSK, i.e., the partial response type is the first category, and the QAM selects QPSK; line width and frequency difference of the laser are typical values of the current technique; the optical fiber link is set as weak non-linear transmission link, i.e., mainly linear damage; the linear equalization algorithm is the typical CMA; the phase recovery algorithm is the most common biquadrate algorithm. Through a large number of simulations, the optimal typical value of α is generally 0.75~0.85.

Figure 3:
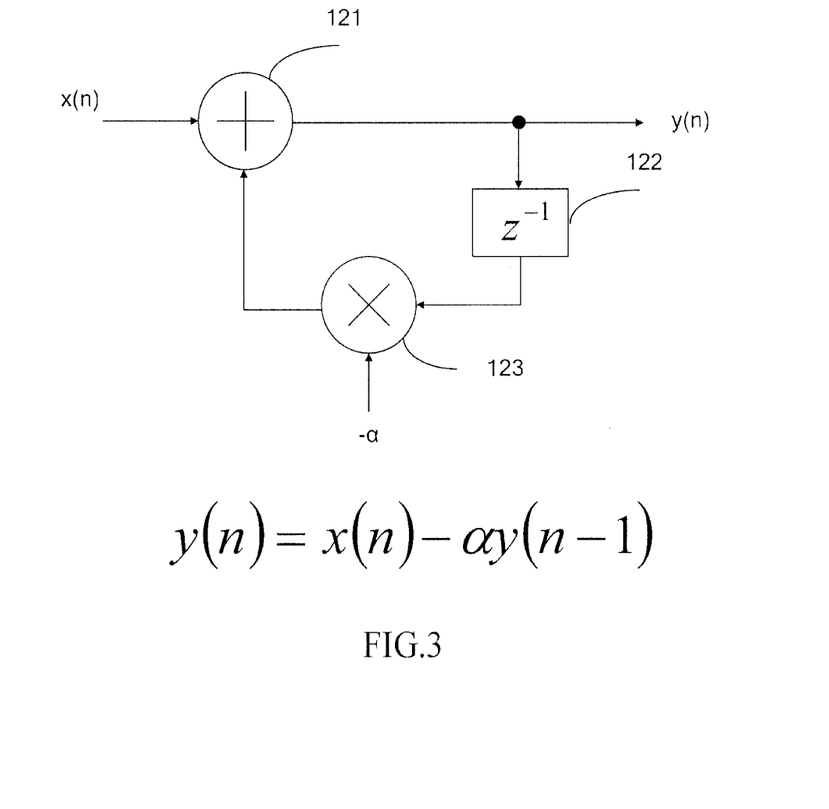
FIG. 3 schematically illustrates a structural diagram of a pre-filter with respect to duobinary signal according to an embodiment of the present invention.

FIG. 3 schematically illustrates a structural diagram of the pre-filter 12 with respect to duobinary signal according to an embodiment of the present invention.

As illustrated in FIG. 3, according to an embodiment of the present invention, the pre-filter 12 includes: an adder 121, a delayer 122 and a multiplier 123. The adder 121 adds an input signal x(n) to an output of the multiplier 123 to obtain an output signal y(n). The delayer 122 delays the output y(n) of the adder 121 for a sample time to obtain y(n−1). The multiplier 123 multiplies the output of the delayer 122 with a predetermined coefficient α, and the obtained product is inputted to the adder 121.

To be noted, the structure of the pre-filter 12 as illustrated in FIG. 3 is just schematically and is not a limitation to the present invention. A person skilled in the art can constitute various pre-filters according to equation (4). In addition, a person skilled in the art is completely able to implement (obtain or fabricate) an appropriate pre-filter according to the above equation (3) and the values of n and m.

Since the PR-QAM signal after going through the pre-filter is converted into the conventional QAM signal, an equalization (preferably, adaptive equalization) and a phase recovery can be carried out via an equalizer for conventional QAM signal (e.g., adaptive equalizer based on CMA algorithm or CMA improved algorithm) and a phase recovering device. The phase recovering device for example includes a frequency difference estimating module, a phase estimating module and a phase recovering module. Any adaptive filter 13 and phase recovery 14 known by a person skilled in the art can be adopted. In one embodiment, for example the adaptive equalizing device may adopt an adaptive equalizing device disclosed in a Chinese patent application "Adaptive Balancing Device and Method thereof" with a publication number CN101599929A by Liu Ling, Et. al., the adaptive equalizing device and the phase recovering device may further adopt those disclosed in a Chinese patent application "Device and Method for Altering Filter Coefficients" with a publication number CN101552640 by Liu Ling, Et. al. These documents are incorporated herein by reference, as they are described detailedly in this text. The carrier phase recovery is suitable to the common algorithms for frequency difference estimation and carrier phase estimation in coherent optical communications, such as the algorithms as described in previous Literatures 8 and 9.

The post-filter 15 is configured to convert the full response signal back to the partial response signal, and it is corresponding to the pre-filter 12. For example, when the pre-filter 12 adopts the transfer function of equation (3), the post-filter 15 adopts the transfer function of equation (1); particularly, when the pre-filter 12 adopts the transfer function of equation (4), the post-filter 15 adopts the transfer function of equation (2).

The data recovering device 16 may adopt various data recovering devices for PR-QAM known by a person skilled in the art, for example, symbol by symbol direct detection device or maximum likelihood sequence detection device (see *Digital Communication* (the 4$^{th}$ edition), written by J. G. Proakis, translated by Zhang Lijun, etc., Beijing: Electronic Industry Press, 2006, pages 407 to 410).

According to the embodiment of the present invention, the PR-QAM signal received by the optical reception front end and having undergone an analog to digital conversion firstly passes through the pre-filter in the embodiment of the present invention, then undergoes a linear equalization by a linear equalizer that adopts the specific constant modulus algorithm (CMA) or improved algorithm upon actual demand, next experiences a carrier phase recovery by the phase recovering device, next goes through the post-filter, and finally achieves a linearly-equalized and phase-recovered PR-QAM signal. In the embodiment of the present invention, the carrier phase recovering module is placed between the pre-filter and post-filter, which brings many advantages. If the carrier phase recovering module is placed in front of the pre-filter, a feedback system (using a phase lock loop in the simulation domain) is required for the phase recovery since the signal is not equalized; if the carrier phase recovering module is placed behind the pre-filter, the carrier phase recovery shall be amended correspondingly according to the constellation characteristic of the PR-QAM signal, and the complexity is higher.

The CMA suitable to conventional QAM signal and its improved algorithm requires the signal to be equalized to meet the statistic characteristic of independent identical distribution. Since the controlled ISI is introduced for the original QAM signal in the PR-QAM system, certain correlation is generated between adjacent symbols, thus the CMA and its improved algorithm cannot be directly applied to the PR-QAM system. In the embodiment of the present invention, the partial response signal is temporarily converted to the full response signal by the pre-filter, i.e., the PR-QAM signal is temporarily converted to the conventional QAM signal. Thus, coherent receiver DSP algorithms (e.g., CMA and its improved algorithm, frequency difference estimation algorithm, carrier phase estimation algorithm, etc.) with respect to the conventional QAM signal can be applied directly without making any amendment, and these algorithms are techniques well known by a person skilled in the art. After the equalization and phase recovery are completed, the PR-QAM signal is recovered through a symmetrical post-filter for the subsequent data decision and detection. Therefore, the embodiment of the present invention makes it possible to reduce the cost of the coherent receiver and improve its performance by using the pre-filter with simple structure and the above configurations.

In addition, although in the above descriptions, the pre-filter, adaptive equalizer, phase recovering device and post-filter are described with respect to one channel of signal, the embodiment of the present invention is also suitable to the polarization multiplexing coherent light communication system. In a polarization multiplexing coherent light communication system, the transmitting terminal transmits information in both polarization states orthogonal to each other, and the coherent optical receiver of polarization diversity is used at the receiving terminal. In the digital coherent optical receiver using polarization diversity, the pre-filter, etc. according to the embodiment of the present invention can also be used.

Figure 4:
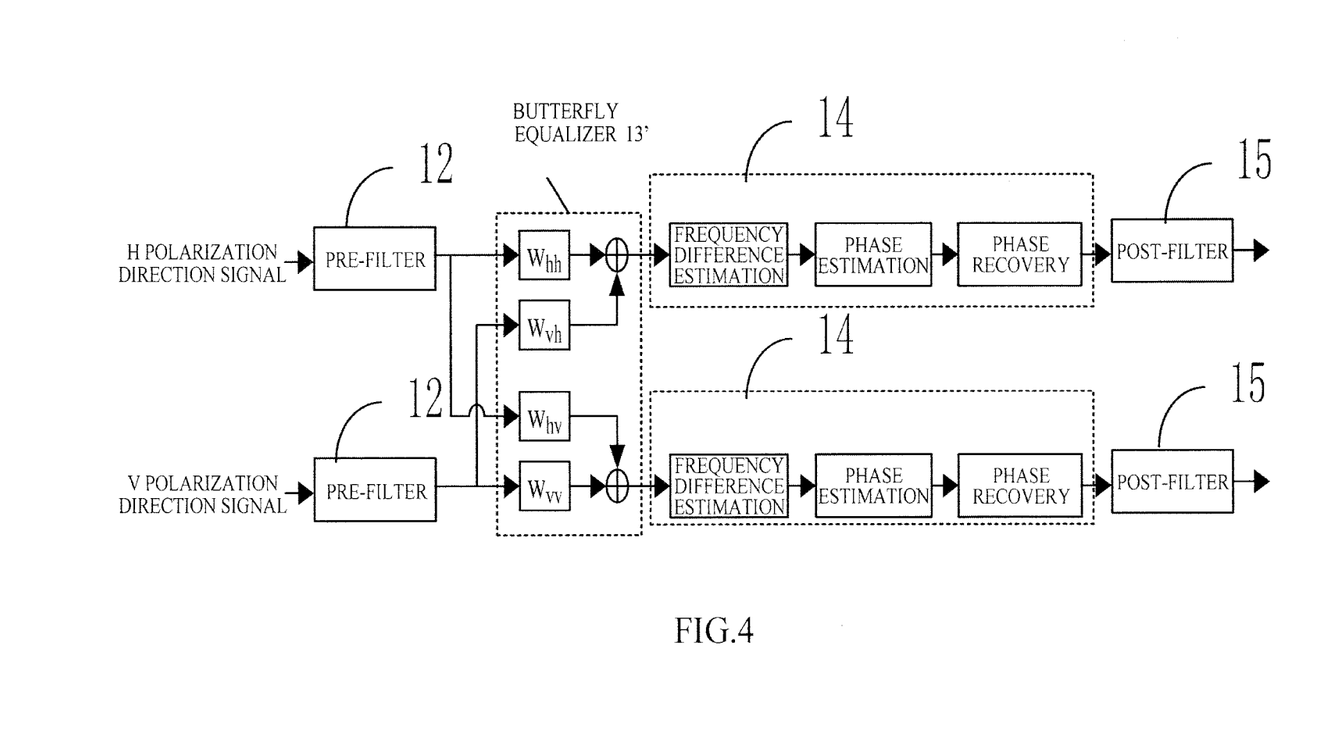
FIG. 4 illustrates a DSP portion of a coherent receiver according to an embodiment of the present invention.

FIG. 4 illustrates a DSP portion of a coherent receiver according to an embodiment of the present invention. As illustrated in FIG. 4, the coherent receiver according to the embodiment of the present invention includes two branches with respect to H polarization direction signal and V polarization direction signal respectively. Each branch includes a pre-filter 12, a phase recovering device 14, a post-filter 15, and a data recovering device (not shown). The equalizing device of the coherent receiver according to the embodiment of the present invention uses a butterfly equalizer 13' (e.g., four FIR filters of CMA-based butterfly structure). $W_{hh}$, $W_{vh}$, $W_{hv}$ and $W_{vv}$ in the figure represent the equivalent transfer functions of the four FIR filters arranged in the butterfly structure.

In the example as illustrated in FIG. 4, the phase recovering device 14 is shown as including a frequency difference estimating module, a phase estimating module and a phase recovering module.

In addition, although the phase recovering device and the equalizing device are illustrated separately in FIG. 4 and the phase recovering device 14 has no feedback with respect to the equalizing device 13, the configuration is not limitative, and the phase recovering device is completely possible to provide adaptive feedback signal, control signal, coefficient adjustment signal, etc. with respect to the equalizing device 13. The type and amount of the feedback signal are also not limitations to the present invention.

Figure 5:
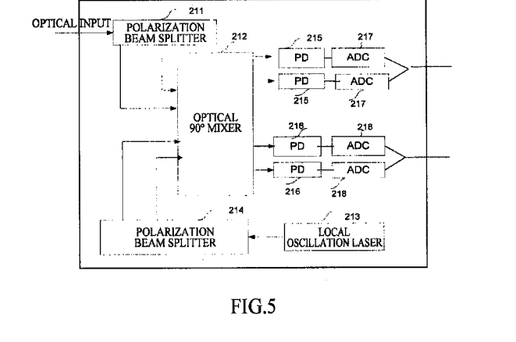
FIG. 5 illustrates an example of a receiver front end that can be used for the coherent receiver as illustrated in FIG. 4.

FIG. 5 illustrates an example of a receiver front end that can be used for the coherent receiver as illustrated in FIG. 4. As illustrated in FIG. 5, an input optical signal of the receiver front end is separated by a polarization beam splitter 211 into two components (H polarization direction and V polarization direction) connected to a first input port and a second input port of an optical 90° mixer 212, respectively. At the same time, the output of a local oscillation laser (local laser) 213 of the receiver is inputted to a polarization beam splitter 214, and also separated into two components (H polarization direction and V polarization direction), then entered into the optical 90° mixer 212. The optical 90° mixer 212 mixes the inputted four channels of signals, and the mixed signals are outputted to two pairs of balance photoelectric detectors (PD) 215, 216, respectively, and further outputted to two pairs of analog to digital converters (ADCs) 217, 218, so as to obtain H polarization direction signal and V polarization direction signal.

Figure 6:
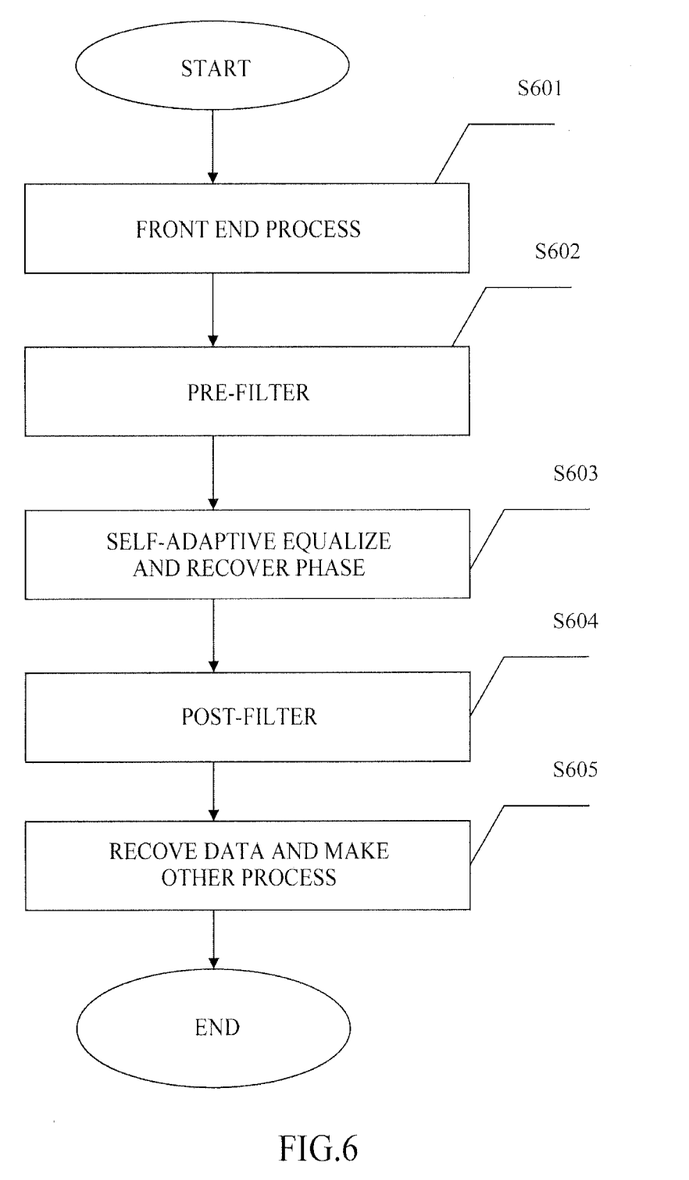
FIG. 6 illustrates a schematic flowchart of a coherent receiving method according to an embodiment of the present invention.

FIG. 6 illustrates a schematic flowchart of a coherent receiving method according to an embodiment of the present invention. As illustrated in FIG. 6, the coherent receiving method according to the embodiment of the present invention firstly performs a front end processing, in process S601, by converting an input optical signal into a digital electric signal. To be noted, the electric signal is PR-QAM electric signal with respect to the embodiments of the present invention.

In process S602, pre-filtering the digital electric signal acquired after the front end processing so as to convert a partial response signal into a full response electric signal. In this process, for example the transfer function of equation (3) is used. Furthermore, in one embodiment, the transfer function of equation (4) is used with respect to the duobinary signal.

In process S603, performing equalization and phase recovery for the full response signal acquired after the pre-filtration. In the preferred embodiment, an adaptive equalization is carried out. The adaptive equalization may adopt an equalization based on CMA or improved algorithm of CMA.

In process S604, post-filtering the phase-recovered signal, so as to convert the full response signal back to the partial response signal. For example, in case the transfer function of equation (3) is used in the pre-filtering process, the transfer function of equation (1) will be used in process S604, and in case the transfer function of equation (4) is used in the pre-filtering process, the transfer function of equation (2) will be used in process S604.

Finally, in process S605, processing such as subsequent data recovery is carried out for the partial response signal acquired after post-filtration. The data recovery can be carried out using various methods known by a person skilled in the art.

In case the coherent receiving method is used for a polarization multiplexing coherent optical communication system, the front end processing process S601 converts the received partial response signal into H polarization direction partial response digital signal and V polarization direction partial response digital signal; the pre-filtering process S602 includes H-path pre-filtering process that pre-filters the H polarization direction partial response digital signal to generate a H polarization direction full response digital signal, and V-path pre-filtering process that pre-filters the V polarization direction partial response digital signal to generate a V polarization direction full response digital signal. In the equalization and phase recovery process S603, the equalization process uses a butterfly equalizer (e.g., four FIR filters arranged in a butterfly structure) to perform a butterfly equalization of the filtered H polarization direction full response digital signal and V polarization direction full response digital signal, so as to generate H polarization direction full response digital equalization signal and V polarization direction full response digital equalization signal; the phase recovery process includes a H-path phase recovering process that performs a phase recovery for the H polarization direction full response digital equalization signal, and a V-path phase recovering process that performs a phase recovery for the V polarization direction full response digital equalization signal.

The post-filtering process S604 includes a H-path post-filtering process that post-filters the phase-recovered H polarization direction full response digital equalization signal, and a V-path post-filtering process that post-filters the phase-recovered V polarization direction full response digital equalization signal.

The data recovery and other processing in process S605 can use any method known in this field, and have no substantial influence on the embodiments of the present invention, thus herein are not described in details.

The above device and method of the present invention can be implemented by hardware, or a combination of hardware and software. The present invention relates to such a computer readable program that enables a logic part to implement the previously described devices and components, or implement the previously described methods and processes, when the program is executed by the logic part. The present invention also relates to storage medium for storing the above program, e.g., hard disk, magnetic disk, optical disk, DVD and flash memory.

The present invention is described in conjunction with the above detailed embodiments. But a person skilled in the art shall be clear that the descriptions are just exemplary, instead of limitations to the protection scope of the present invention. A person skilled in the art can make various modifications and changes to the present invention based on spirit and principle of the present invention, and those modifications and changes are also within the scope of the present invention.

What is claimed is:

1. A coherent receiver, comprising:
    a receiver front end for converting a received partial response optical signal into a partial response digital signal;
    a pre-filter for converting the partial response digital signal into a full response digital signal;
    an equalizing device for equalizing the pre-filtered full response digital signal;
    a phase recovering device for performing a phase recovery of a signal equalized by the equalizing device; and
    a post-filter for post-filtering a signal having undergone a phase recovery by the phase recovering device, so as to recover the full response digital signal to the partial response digital signal, wherein a transfer function of the post-filter is same as that of the partial response digital signal,
    wherein the pre-filter uses the following transfer function $H_{Pre-Filter}(z)$ with respect to a partial response signal having a transfer function $H_{PR}(z)=A(1+z^{-1})^m(1-z^{-1})^n$:

$$H_{Pre-Filter}(z) = \frac{1}{A(1+\alpha z^{-1})^m(1-\alpha z^{-1})^n},$$

in which A is other item, m and n are integers larger than or equal to 0 but not being 0 at the same time, $0<\alpha<1$.

2. The coherent receiver according to claim 1, wherein the A takes a value as 1.

3. The coherent receiver according to claim 1, wherein the m takes a value as 1, and the n takes a value as 0.

4. The coherent receiver according to claim 1, wherein $\alpha$ is between 0.75 and 0.85.

5. The coherent receiver according to claim 1, wherein the equalizing device performs an adaptive equalization by using a constant modulus algorithm (CMA) or an improved algorithm based on the CMA.

6. The coherent receiver according to claim 1, wherein
    the coherent receiver is used for a polarization multiplexing coherent light communication system;
    the receiver front end is used converting the received optical signal into partial response digital signals in H and V polarization directions;
    the coherent receiver further comprises another pre-filter having a configuration same as that of the pre-filter, another phase recovering device having a configuration same as that of the phase recovering device, and another post-filter having a configuration same as that of the post-filter, the pre-filter pre-filters the partial response digital signal in the H polarization direction to generate full response digital signal in the H polarization direction;

the another pre-filter pre-filters the partial response digital signal in the V polarization direction to generate full response digital signal in the V polarization direction;

the equalizing device is a butterfly equalizer that performs butterfly equalization and polarization de-multiplexing of the filtered full response digital signals in the H and V polarization directions, so as to obtain de-multiplexed full response digital equalization signals in the H and V polarization directions;

the phase recovering device performs a phase recovery of the full response digital equalization signal in the H polarization direction, the another phase recovering device performs a phase recovery of the full response digital equalization signal in the V polarization direction, the post-filter post-filters the phase-recovered full response digital equalization signal in the H polarization direction, and the another post-filter post-filters the phase-recovered full response digital equalization signal in the V polarization direction.

7. A coherent receiving method, comprising:

a front end processing process for converting a received partial response optical signal into a partial response digital signal;

a pre-filtering process for converting the partial response digital signal into a full response digital signal, based on partial response type of the partial response digital signal;

an equalizing process for equalizing the full response digital signal;

a phase recovering process for performing a phase recovery of a signal having undergone the equalizing process; and a post-filtering process for post-filtering a phase recovered signal having undergone the phase recovering process, wherein a transfer function used in the post-filtering process is same as that of the partial response digital signal, wherein the pre-filtering process uses the following transfer function $H_{Pre-Filter}(z)$ with respect to a partial response signal having a transfer function $H_{PR}(z)=A(1+z^{-1})^m(1-z^{-1})^n$:

$$H_{Pre-Filter}(z) = \frac{1}{A(1+\alpha z^{-1})^m(1-\alpha z^{-1})^n},$$

in which A is other item, m and n are integers larger than or equal to 0 but not being 0 at the same time, $0<\alpha<1$.

8. The coherent receiver according to claim 7, wherein the A takes a value as 1.

9. The coherent receiver according to claim 7, wherein the m takes a value as 1, and the n takes a value as 0.

10. The coherent receiver according to claim 7, wherein $\alpha$ is between 0.75 and 0.85.

11. The coherent receiving method according to claim 7, wherein the equalizing process performs an adaptive equalization by using a constant modulus algorithm (CMA) or an improved algorithm based on the CMA.

12. The coherent receiving method according to claim 7, wherein the coherent receiving method is used for a polarization multiplexing coherent light communication system;

the front end processing process converts the received optical signal into partial response digital signals in H and V polarization directions;

the pre-filtering process comprises a H-path pre-filtering process for pre-filtering the partial response digital signal in the H polarization direction to generate full response digital signal in the H polarization direction, and a V-path pre-filtering process for pre-filtering the partial response digital signal in the V polarization direction to generate full response digital signal in the V polarization direction;

the equalizing process uses a butterfly equalizer to perform butterfly equalization and polarization de-multiplexing of the filtered full response digital signals in the H and V polarization directions, so as to generate polarization de-multiplexed full response digital equalization signals in the H and V polarization directions;

the phase recovering process comprises a H-path phase recovering process for performing a phase recovery of the full response digital equalization signal in the H polarization direction, and a V-path phase recovering process for performing a phase recovery of the full response digital equalization signal in the V polarization direction;

the post-filtering process comprises a H-path post-filtering process for post-filtering the phase-recovered full response digital equalization signal in the H polarization direction, and a V-path post-filtering process for post-filtering the phase-recovered full response digital equalization signal in the V polarization direction.

* * * * *